US012798139B2

(12) United States Patent
Sugiyama et al.

(10) Patent No.: US 12,798,139 B2
(45) Date of Patent: Nov. 17, 2026

(54) CHIP MANUFACTURING METHOD

(71) Applicant: DISCO CORPORATION, Tokyo (JP)

(72) Inventors: Tomoaki Sugiyama, Tokyo (JP); Naoko Yamamoto, Tokyo (JP)

(73) Assignee: DISCO CORPORATION, Tokyo (JP)

(*) Notice: Subject to any disclaimer, the term of this patent is extended or adjusted under 35 U.S.C. 154(b) by 100 days.

(21) Appl. No.: 18/678,755

(22) Filed: May 30, 2024

(65) Prior Publication Data

US 2024/0424705 A1 Dec. 26, 2024

(30) Foreign Application Priority Data

Jun. 22, 2023 (JP) ................................ 2023-102774

(51) Int. Cl.

| | |
|---|---|
| ***B26D 3/06*** | (2006.01) |
| ***B24B 27/00*** | (2006.01) |
| ***B26D 1/157*** | (2006.01) |
| ***B26D 7/27*** | (2006.01) |

(52) U.S. Cl.

CPC .............. *B26D 3/065* (2013.01); *B24B 27/00* (2013.01); *B26D 1/1575* (2013.01); *B26D 7/27* (2013.01)

(58) Field of Classification Search

CPC ............. Y10T 83/0304; Y10T 83/0311; Y10T 83/0326; Y10T 83/0333; Y10T 83/0341; Y10T 83/0348; Y10T 83/0363; Y10T 83/037; Y10T 83/0378; Y10T 83/0385; Y10T 83/04; B26D 3/065; B26D 3/06; B26D 3/08; B26D 3/085; B26D 1/1575; B26D 7/27; B24B 27/00; H01L 21/304; H01L 21/3043

See application file for complete search history.

(56) References Cited

U.S. PATENT DOCUMENTS

| | | | | |
|---|---|---|---|---|
| 6,294,439 B1 * | 9/2001 | Sasaki | ................. | H01L 21/6836 438/33 |
| 10,784,165 B2 * | 9/2020 | Masuko | .................. | H01L 21/78 |
| 2004/0072388 A1 * | 4/2004 | Sekiya | ................... | B28D 5/022 257/E21.599 |
| 2005/0106782 A1 * | 5/2005 | Genda | ..................... | H10P 54/00 438/118 |
| 2019/0122928 A1 * | 4/2019 | Norimoto | ............. | H01L 21/304 |
| 2021/0082760 A1 * | 3/2021 | Martin | ................ | H01L 21/6836 |

FOREIGN PATENT DOCUMENTS

JP 2003007653 A 1/2003

* cited by examiner

*Primary Examiner* — Phong H Nguyen

(74) *Attorney, Agent, or Firm* — GREER BURNS & CRAIN, LTD.

(57) ABSTRACT

A chip manufacturing method for manufacturing a plurality of chips by dividing a workpiece with a plurality of intersecting streets set thereon includes a cutting step of cutting a front surface of the workpiece by a cutting blade to thereby form cut grooves along the streets, and then a grinding step of grinding a back surface on the side opposite to the front surface of the workpiece to thereby thin the workpiece to a finish thickness of reaching the cut grooves and to divide the workpiece into the plurality of chips. The cut grooves are formed such that the position of the groove bottom in the thickness direction of the workpiece varies in the width direction of the cut groove, and, in the grinding step, grinding is started from that tip of the groove bottom of the cut groove which is remote from the front surface of the workpiece.

10 Claims, 13 Drawing Sheets

CHIP MANUFACTURING METHOD

BACKGROUND OF THE INVENTION

Field of the Invention

The present invention relates to a manufacturing method for manufacturing a plurality of chips by dividing a workpiece with a plurality of intersecting streets set thereon.

Description of the Related Art

As a technique for thinning a semiconductor wafer and dividing the wafer into individual device chips, a process called dicing before grinding (DBG) has been proposed (see, for example, Japanese Patent Laid-open No. 2003-007653).

In the DBG process, a front surface side of the wafer formed with devices is cut along streets by a cutting blade to form cut grooves having a depth smaller than a thickness of the wafer along the streets. Thereafter, a front surface protective member is disposed on the front surface side of the wafer, and then a back surface side of the wafer is subjected to grinding, so that the grooves are exposed on the back surface side of the wafer and the wafer is divided into a plurality of device chips.

SUMMARY OF THE INVENTION

However, the method disclosed in Japanese Patent Laid-open No. 2003-007653 has a problem that, when the back surface side of the wafer is gradually ground, the groove bottoms of the cut grooves would become thinner and be cracked during grinding, and fragments would drop. If the fragments are deposited on other devices during a later step or handling of the wafer, device defects might be caused.

Accordingly, it is an object of the present invention to provide a chip manufacturing method by which it is possible to restrain fragments from dropping during grinding.

In accordance with an aspect of the present invention, there is provided a manufacturing method for manufacturing a plurality of chips by dividing a workpiece with a plurality of intersecting streets set thereon, the manufacturing method including a cutting step of cutting one surface of the workpiece by a cutting blade to thereby form cut grooves along the streets, and a grinding step of grinding another surface on a side opposite to the one surface of the workpiece to thereby thin the workpiece to a finish thickness of reaching the cut grooves and to divide the workpiece into the plurality of chips, after the cutting step is carried out. In the manufacturing method, the cut grooves are formed such that a position of a groove bottom in a thickness direction of the workpiece varies in a width direction of the cut groove, and, in the grinding step, grinding is started from a tip of the groove bottom.

Preferably, in the cutting step, depths of all the groove bottoms of the cut grooves from the one surface are greater than the finish thickness from the one surface. Preferably, in the cutting step, the cut grooves are formed by a cutting blade of which a blade thickness is gradually reduced toward a tip.

Preferably, in the cutting step, the cutting blade is caused to cut into each street a plurality of times with a cutting-in depth and a cutting-in position varied.

The present invention produces an effect that it is possible to restrain fragments from dropping during grinding.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described in detail below with reference to the drawings. The present invention is not to be limited by the contents of the embodiments described below. In addition, the constituent elements described below include those which can easily be conceived of by a person skilled in the art and those which are substantially the same. Further, the configurations described below can be combined with one another as required. Besides, various kinds of omission, replacement, or modification of the configuration can be made in such ranges as not to depart from the gist of the invention.

First Embodiment

Figure 1:
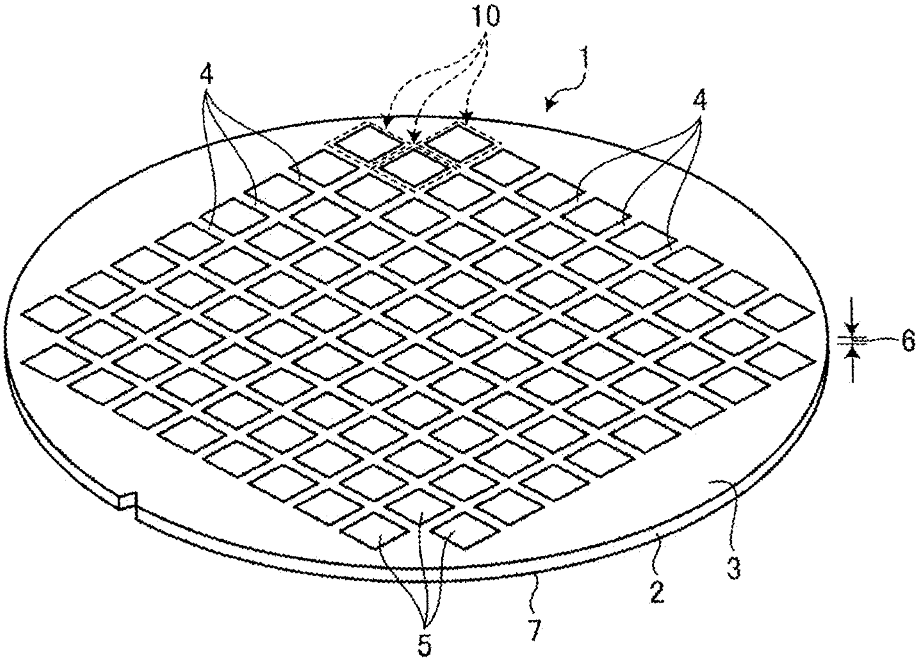
FIG. 1 is a perspective view schematically depicting a workpiece which is an object to be processed by a manufacturing method according to a first embodiment of the present invention.
Figure 2:
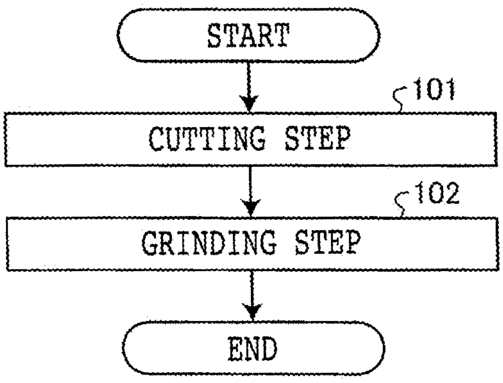
FIG. 2 is a flowchart depicting a flow of the manufacturing method according to the first embodiment.

A manufacturing method according to a first embodiment of the present invention will be described with reference to the drawings. FIG. 1 is a perspective view schematically depicting a workpiece as an object to the processed by the manufacturing method according to the first embodiment. FIG. 2 is a flowchart depicting the flow of the manufacturing method according to the first embodiment.

The manufacturing method according to the embodiment is a method of processing a workpiece 1 depicted in FIG. 1. The workpiece 1 as the object to be processed by the manufacturing method according to the embodiment is a wafer such as a disk-shaped semiconductor wafer or optical device wafer having a substrate 2 formed of silicon (Si), gallium arsenide (GaAs), silicon carbide (SiC), sapphire, or the like.

The workpiece 1 has a plurality of intersecting streets 4 set on a front surface 3 (corresponding to one surface) thereof, and devices 5 are respectively formed in regions partitioned by the streets 4 on the front surface 3. The devices 5 are, for example, integrated circuit devices such as integrated circuits (ICs) or large scale integration (LSI) circuits, image sensors such as charge coupled device (CCD) image sensors or complementary metal oxide semiconductor (CMOS) image sensors, optical devices such as light-emitting diodes (LEDs), micro electro mechanical systems (MEMS), or semiconductor memories (semiconductor storage devices).

The workpiece 1 is thinned to a finish thickness 6, and is divided along the streets 4 into individual chips 10. Note that the chips 10 each include a part of the substrate 2 and the device 5.

In addition, in the first embodiment, unillustrated test element groups (TEGs) are formed on the front surface 3 in the streets 4. The TEG is an element configured by use of conductive metal and is used for evaluation for finding out problems on design basis or manufacture basis that have occurred in the devices 5.

Note that, in the present invention, the workpiece 1 may not have the devices 5 formed thereon, and are not limited to such wafers as semiconductor wafers and optical device wafers; for example, the workpiece 1 may be a rectangular package substrate having a plurality of devices which are sealed with resin, a ceramic substrate, a glass substrate, or the like.

The manufacturing method according to the first embodiment is a method of manufacturing a plurality of chips 10 by dividing the workpiece 1 formed with the plurality of intersecting streets 4 along the streets 4. The manufacturing method according to the first embodiment includes a cutting step 101 and a grinding step 102, as depicted in FIG. 2.

(Cutting Step)

Figure 3:
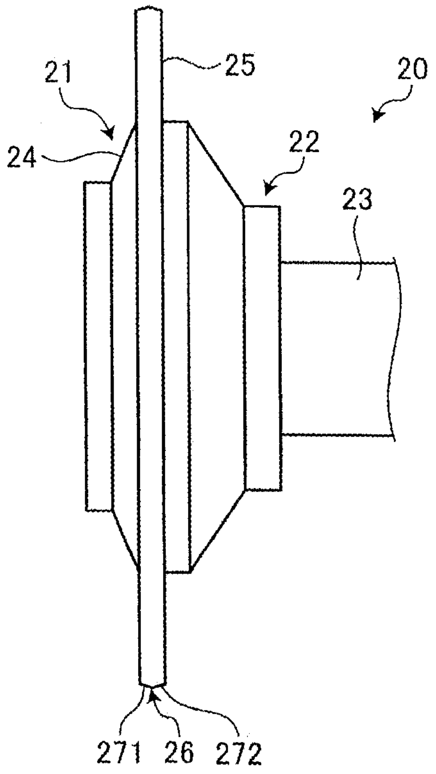
FIG. 3 is a front view of a cutting unit to be used in a cutting step of the manufacturing method depicted in FIG. 2.
Figure 4:
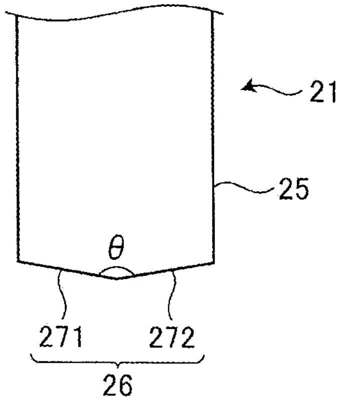
FIG. 4 is a front view of an edge point of a cutting blade of the cutting unit depicted in FIG. 3.
Figure 5:
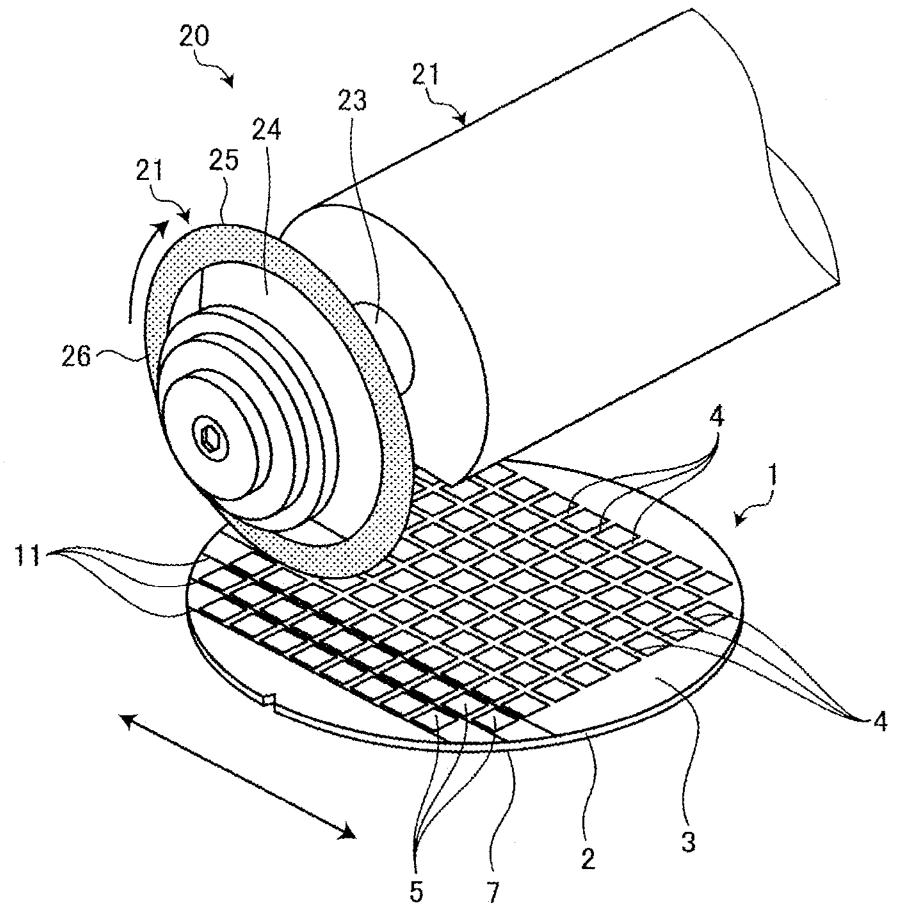
FIG. 5 is a perspective view schematically depicting the cutting step of the manufacturing method depicted in FIG. 2.
Figure 6:
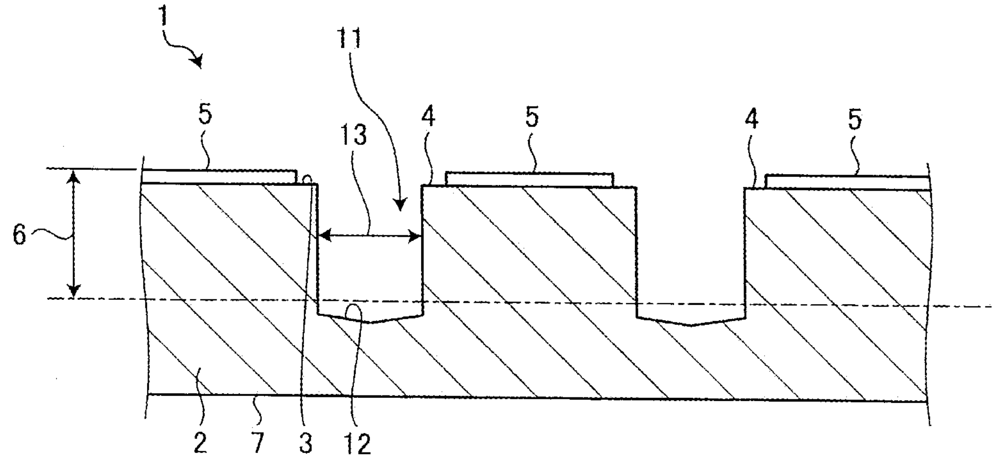
FIG. 6 is a sectional view depicting a major part of the workpiece that has undergone the cutting step of the manufacturing method depicted in FIG. 2.
Figure 7:
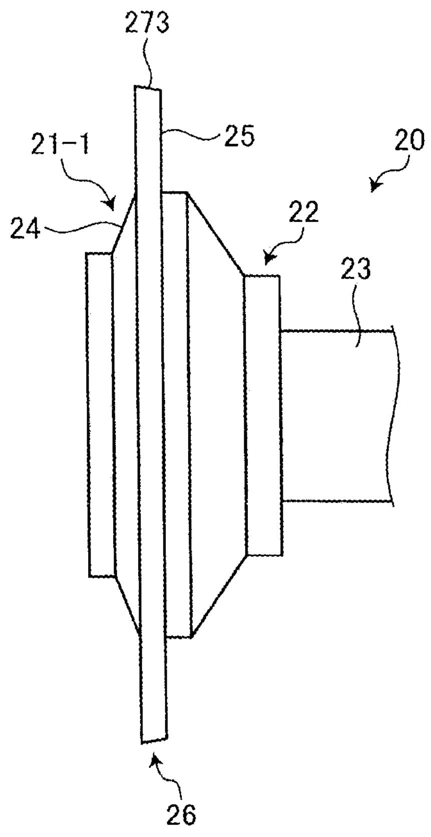
FIG. 7 is a front view of a modification of the cutting unit depicted in FIG. 3.
Figure 8:
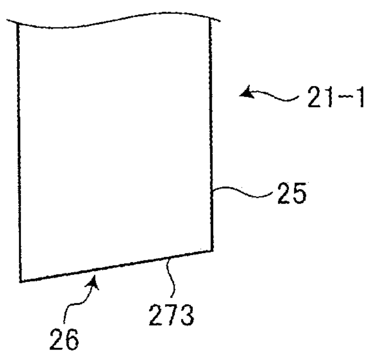
FIG. 8 is a front view of an edge point of a cutting blade of the cutting unit depicted in FIG. 7.

FIG. 3 is a front view of a cutting unit used in the cutting step of the manufacturing method depicted in FIG. 2. FIG. 4 is a front view of an edge point of a cutting blade of the cutting unit depicted in FIG. 3. FIG. 5 is a perspective view schematically depicting the cutting step of the manufacturing method depicted in FIG. 2. FIG. 6 is a sectional view depicting a major part of the workpiece that has undergone the cutting step of the manufacturing method depicted in FIG. 2. FIG. 7 is a front view of a modification of the cutting unit depicted in FIG. 3. FIG. 8 is a front view of an edge point of a cutting blade of the cutting unit depicted in FIG. 7.

The cutting step 101 is a step of cutting the front surface 3 of the workpiece 1 by the cutting blade 21 depicted in FIGS. 3 and 4, to thereby form cut grooves 11 (depicted in FIGS. 5 and 6) along the streets 4. In the first embodiment, the cutting blade 21 used in the cutting step 101 is mounted to a tip of a spindle 23 of a cutting unit 22 of a cutting apparatus 20, is rotated around an axis of the spindle 23, and cuts the workpiece 1.

In the first embodiment, the cutting blade 21 is an extremely thin cutting grindstone having a substantially annular shape. In the first embodiment, the cutting blade 21 is what is generally called a hub blade that includes an annular base 24 and an annular cutting edge 25 disposed at a peripheral edge of the annular base 24 and used to cut the workpiece 1. The cutting edge 25 is configured by abrasive grains of diamond, cubic boron nitride (CBN), or the like and a bonding material (binder) such as metal or resin, and is formed in a predetermined thickness. Note that, in the present invention, the cutting blade 21 may be what is generally called a washer blade that does not include the annular base 24 but only the annular cutting edge 25.

In the first embodiment, an edge point 26 of the cutting edge 25 of the cutting blade 21 is formed in a V shape in which it is the greatest in outside diameter at the center in the thickness direction and is gradually reduced in outside diameter from the center in the thickness direction toward both surfaces. In the first embodiment, the cutting blade 21 is what is generally called a V blade. In the first embodiment, the edge point 26 of the cutting edge 25 of the cutting blade 21 has two tip surfaces 271 and 272 that intersect each other and are flat in section, as depicted in FIG. 4. Note that an angle θ formed between the tip surfaces 271 and 272 of the edge point 26 of the cutting edge 25 of the cutting blade 21 is not less than 120° but not more than 160°. Thus, in the cutting step 101, the cut grooves 11 are formed by the cutting blade 21 of which the blade thickness is gradually reduced toward the tip.

In the cutting step 101 of the first embodiment, the cutting apparatus 20 performs alignment in which a back surface 7 (corresponding to the other surface) of the workpiece 1 is held under suction on a holding surface of a chuck table, the chuck table is moved toward a processing region, the workpiece 1 is imaged by an unillustrated imaging unit, and alignment between the street 4 and the cutting edge 25 of the cutting blade 21 is performed. In the cutting step 101 of the first embodiment, while supplying cutting water to the cutting blade 21 rotated around an axis and moving the workpiece 1 and the cutting unit 22 relative to each other along the street 4, the cutting apparatus 20 causes the cutting blade 21 to sequentially cut into the streets 4 in a cutting-in depth greater than the finish thickness 6, to thereby form the workpiece 1 with the cut grooves 11 along the streets 4, as depicted in FIG. 5.

In the cutting step 101 of the first embodiment, the cutting apparatus 20 causes the cutting blade 21 to cut once into each street 4 from the front surface 3 side of the workpiece 1 in a cutting-in depth greater than the finish thickness 6. Hence, in the cutting step 101 of the first embodiment, the cutting apparatus 20 forms the cut groove 11 having a V-shaped groove bottom 12 at each street 4, as depicted in FIG. 6. In this way, in the cutting step 101 of the first embodiment, the depths of all the groove bottoms 12 of the cut grooves 11 from the front surface 3 are formed to be greater than the finish thickness 6 from the front surface 3, and the cut grooves 11 are each formed such that the position of the groove bottom 12 in the thickness direction of the workpiece 1 varies in the width direction of the cut groove 11.

In addition, in the first embodiment of the present invention, a cutting blade 21-1 used in the cutting step 101 may be what is generally called a one-side V blade in which a tip surface 273 of the edge point 26 of the cutting edge 25 is formed of one surface which is inclined relative to the axis and the section of which is flat.

In addition, in the cutting step 101 of the first embodiment, the cut grooves 11 having a width 13 of not less than 50 μm but not more than 150 μm are formed. Besides, in the present invention, the width 13 of the cut grooves 11 is preferably such a width that the TEG formed on the street 4 can completely be removed by cutting.

Note that the cutting blade 21 or 21-1 to be used in the above-described cutting step 101 may be such a blade that the edge point 26 of the cutting edge 25 is in an R shape or tapered, but, in that case, management of the shape of the edge point 26 is difficult (shaping into a desired shape is difficult), and, hence, the cutting blade 21 or 21-1 to be used in the cutting step is preferably the V blade depicted in FIG. 4 or the one-side V blade depicted in FIG. 8. Besides, the cutting blade 21 or 21-1 is desirably subjected to checking of the shape of the edge point 26 of the cutting edge 25 at a predetermined timing and is desirably subjected to dressing to be reshaped into the V shape or the one-side V shape.

When the shape of the edge point 26 of the cutting edge 25 of the cutting blade 21 or 21-1 is reshaped, the cutting edge 25 is caused to cut into a dress board to reshape the edge point 26. Specifically, when the shape of the edge point 26 of the cutting edge 25 of the cutting blade 21 or 21-1 is reshaped, the cutting edge 25 is caused to cut into the dress board in the same motion as that in flat dressing (that is, the rotating cutting blade 21 is moved along the axis from a state in which the cutting blade 21 is positioned at a predetermined cutting-in depth and is positioned on the peripheral side of the dress board). Note that, by adjustment of the kind of the dress board to be used (the size of the abrasive grains contained and the binder) and the Y-axis moving speed, an inclination in the thickness direction is formed at the edge point 26 of the cutting edge 25 of the cutting blade 21 or 21-1. In the case of forming the edge point 26 into the one-side V shape, the cutting blade 21 is moved in only one way in the axis direction to form the one-side V shape, and, in the case of forming the edge point 26 into the V shape, the cutting blade 21 is moved in only one way in the axis direction to form an inclination in a region of one half in the thickness direction and is thereafter moved in the other way in the axis direction to form an inclination in the region of the remaining one half in the thickness direction.

(Grinding Step)

Figure 9:
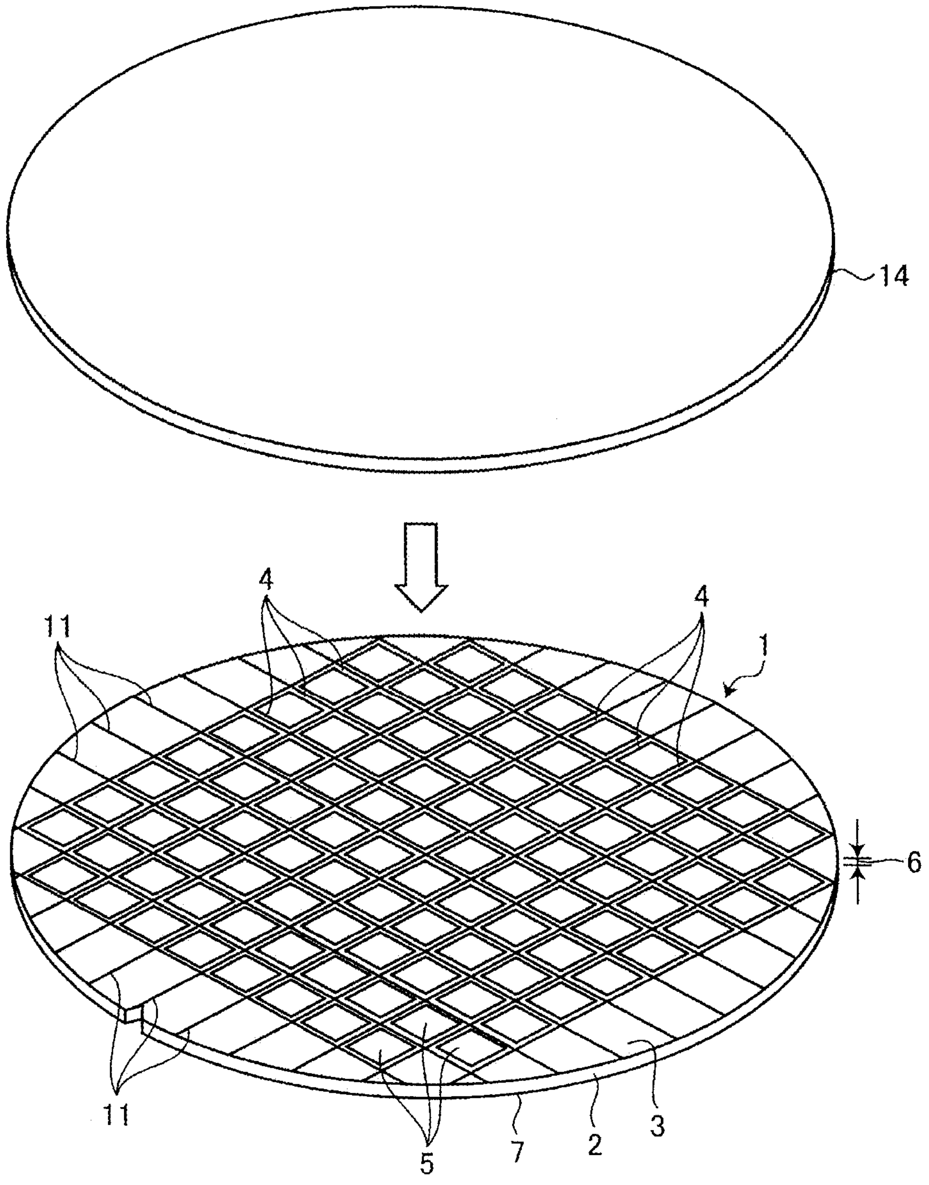
FIG. 9 is a perspective view schematically depicting a state in which a front surface protective member is stuck to a front surface of the workpiece in a grinding step of the manufacturing method depicted in FIG. 2.
Figure 10:
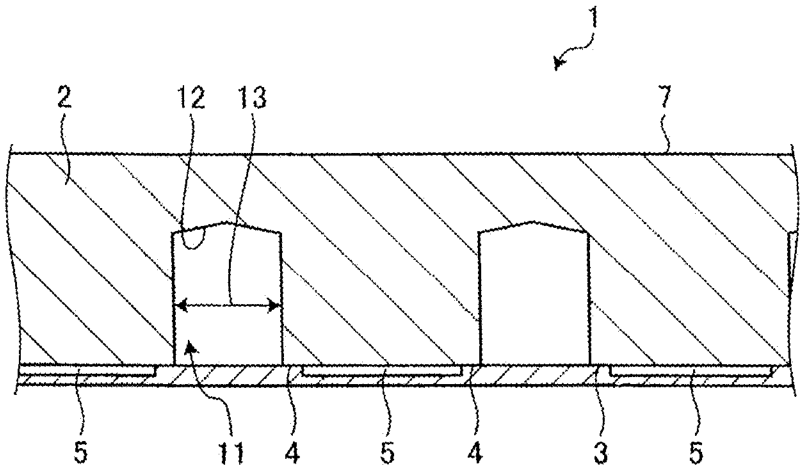
FIG. 10 is a sectional view schematically depicting a major part of the workpiece with the front surface protective member stuck to the front surface thereof in the grinding step of the manufacturing method depicted in FIG. 2.
Figure 11:
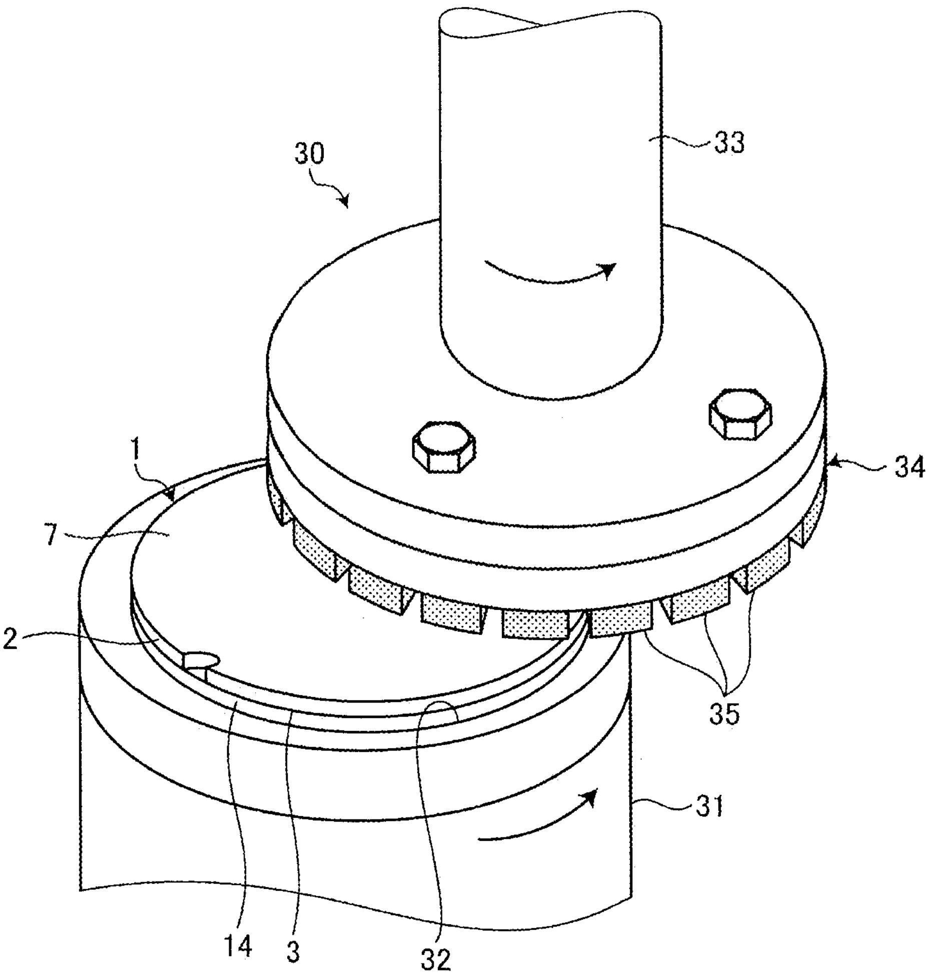
FIG. 11 is a perspective view schematically depicting an intermediate point of grinding of the back surface of the workpiece in the grinding step of the manufacturing method depicted in FIG. 2.
Figure 12:
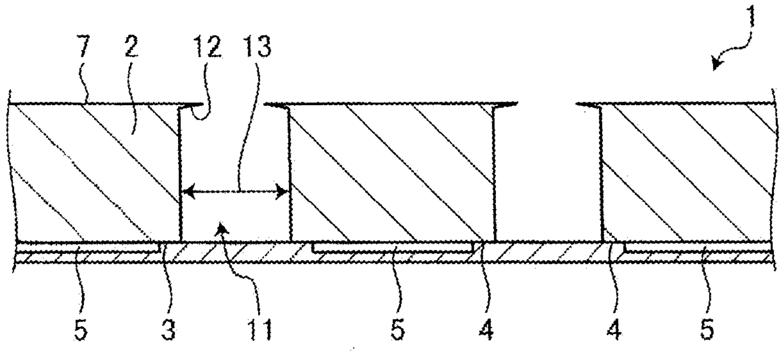
FIG. 12 is a sectional view schematically depicting a major part of the workpiece at an intermediate point of grinding of the back surface in the grinding step of the manufacturing method depicted in FIG. 2.
Figure 13:
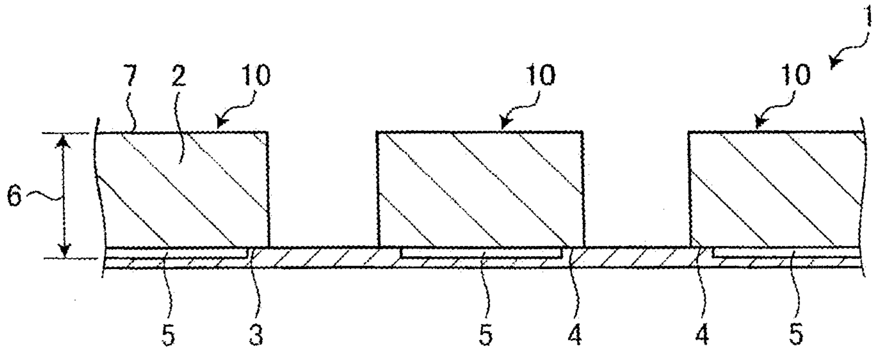
FIG. 13 is a sectional view schematically depicting a major part of the workpiece that has undergone the grinding step of the manufacturing method depicted in FIG. 2.

FIG. 9 is a perspective view schematically depicting a state in which the front surface protective member is stuck to the front surface of the workpiece in the grinding step of the manufacturing method depicted in FIG. 2. FIG. 10 is a sectional view schematically depicting a major part of the workpiece with the front surface protective member stuck to the front surface thereof in the grinding step of the manufacturing method depicted in FIG. 2. FIG. 11 is a perspective view schematically depicting an intermediate point of grinding of the back surface of the workpiece in the grinding step of the manufacturing method depicted in FIG. 2. FIG. 12 is a sectional view schematically depicting a major part of the workpiece of which the back surface is ground in the grinding step of the manufacturing method depicted in FIG. 2. FIG. 13 is a sectional view schematically depicting a major part of the workpiece that has undergone the grinding step of the manufacturing method depicted in FIG. 2.

The grinding step 102 is a step of grinding the back surface 7 as the other surface on the side opposite to the front surface 3 of the workpiece 1 to thereby thin the workpiece 1 to the finish thickness 6 of reaching the cut grooves 11 and to divide the workpiece 1 into a plurality of chips 10, after the cutting step 101 is carried out. In the grinding step 102 of the first embodiment, the front surface protective member 14 depicted in FIGS. 9 and 10 is stuck to the front surface 3 of the workpiece 1.

Note that, in the first embodiment, the front surface protective member 14 is a pressure sensitive adhesive tape including a base material configured by flexible and non-sticky resin and a glue layer laminated on the base material and configured by flexible and sticky resin. In the present invention, the front surface protective member 14 may be a glueless tape which has no glue layer but only a base material configured by non-sticky thermoplastic resin and is to be thermocompression-bonded to the workpiece, or may be a hard plate formed in a disk shape from rigid resin.

In the grinding step 102 of the first embodiment, a grinding apparatus 30 holds under suction the front surface 3 side of the workpiece 1 by a holding surface 32 of a chuck table 31, with the front surface protective member 14 therebetween. In the grinding step 102 of the first embodiment, while rotating a grinding wheel 34 for grinding around an axis by the spindle 33, rotating the chuck table 31 around an axis, and supplying grinding water from an unillustrated grinding water nozzle, the grinding apparatus 30 puts a grinding grindstone 35 of the grinding wheel 34 into contact with the back surface 7 of the workpiece 1 and brings the grinding grindstone 35 closer to the chuck table 31 at a predetermined feed rate, to thereby grind the back surface 7 side of the workpiece 1 by the grinding grindstone 35, as depicted in FIG. 11.

In the grinding step 102 of the first embodiment, the grinding apparatus 30 grinds the workpiece 1 from that tip of the groove bottom 12 of the cut groove 11 which is on the side remote from the front surface 3, as depicted in FIG. 12. In the grinding step 102 of the first embodiment, as depicted in FIG. 13, when the thickness of the workpiece 1 has become the finish thickness 6, the grinding apparatus 30 spaces the grinding wheel 34 away from the back surface 7 of the workpiece 1, to thereby finish the grinding step 102. As a result, the cut grooves 11 are exposed on the back surface 7 side of the workpiece 1, and the workpiece 1 is divided into the individual chips 10. In this way, in the grinding step 102 of the first embodiment, the workpiece 1 is ground from the tip of the groove bottom 12 of the cut groove 11.

The manufacturing method according to the first embodiment described above is configured such that, in the cutting step 101, the cut grooves 11 are formed in such a manner that the depth of the groove bottom 12 of the cut groove 11 from the front surface 3 varies in the width direction. Hence, in the grinding step 102 of the manufacturing method according to the first embodiment, the workpiece 1 is gradually ground from that tip of the groove bottom 12 of the cut groove 11 which is remote from the front surface 3, and, accordingly, fragments are less likely to drop into the cut grooves 11.

Consequently, the manufacturing method according to the first embodiment produces such an effect that it is possible to restrain the fragments from dropping during grinding.

Second Embodiment

Figure 14:
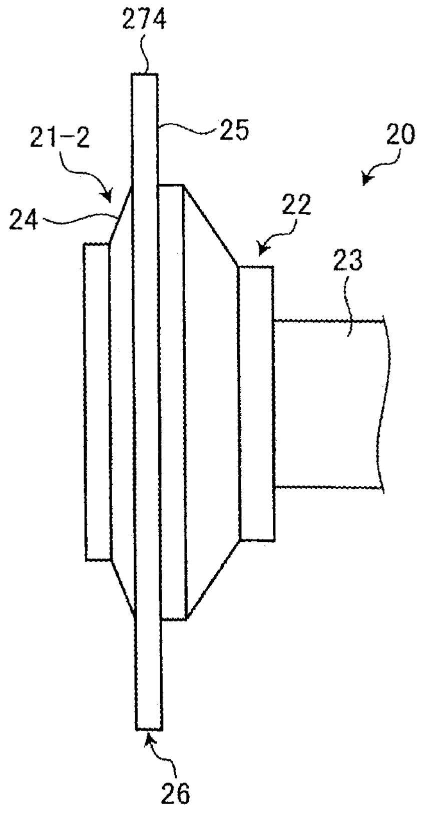
FIG. 14 is a front view of the cutting unit used in a cutting step of a manufacturing method according to a second embodiment of the present invention.
Figure 15:
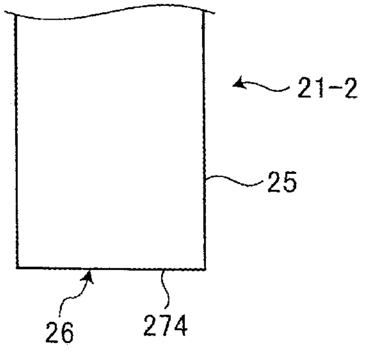
FIG. 15 is a front view of an edge point of a cutting blade of the cutting unit depicted in FIG. 14.
Figure 16:
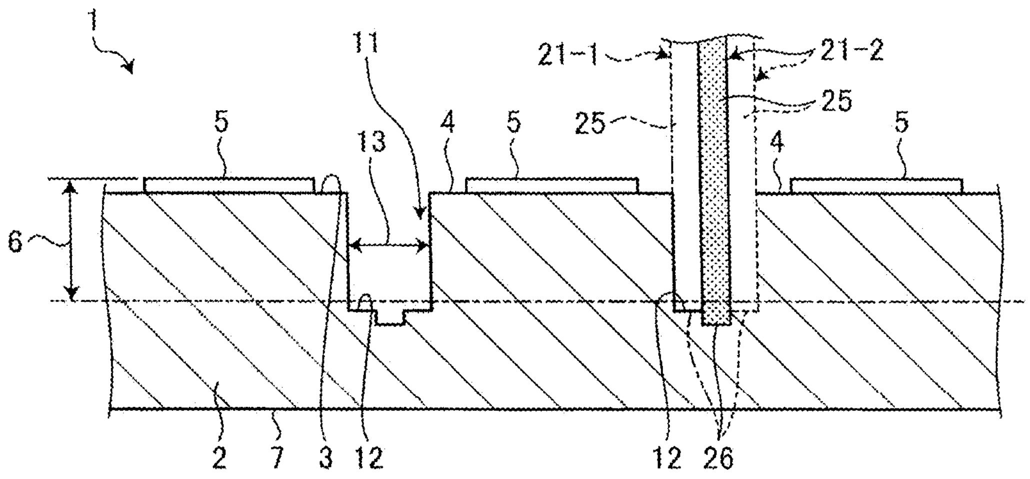
FIG. 16 is a sectional view schematically depicting a major part of the workpiece during the cutting step of the manufacturing method according to the second embodiment.
Figure 17:
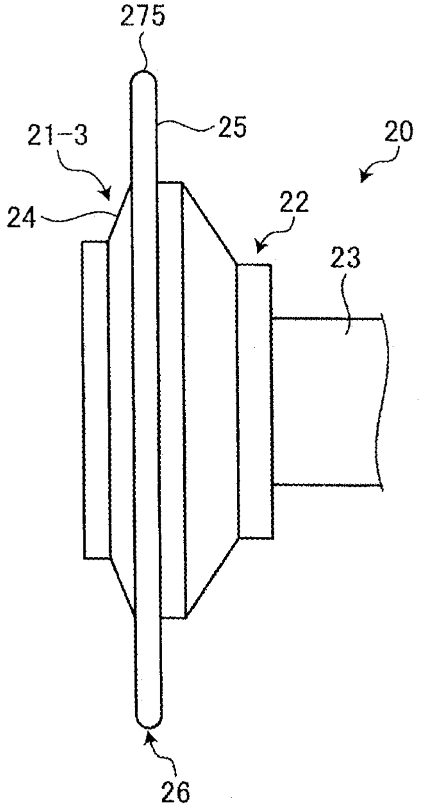
FIG. 17 is a front view of a modification of the cutting unit depicted in FIG. 14.
Figure 18:
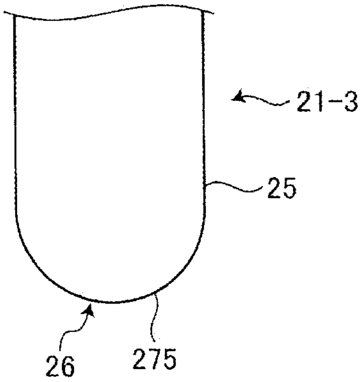
FIG. 18 is a front view of an edge point of a cutting blade of the cutting unit depicted in FIG. 17.
Figure 19:
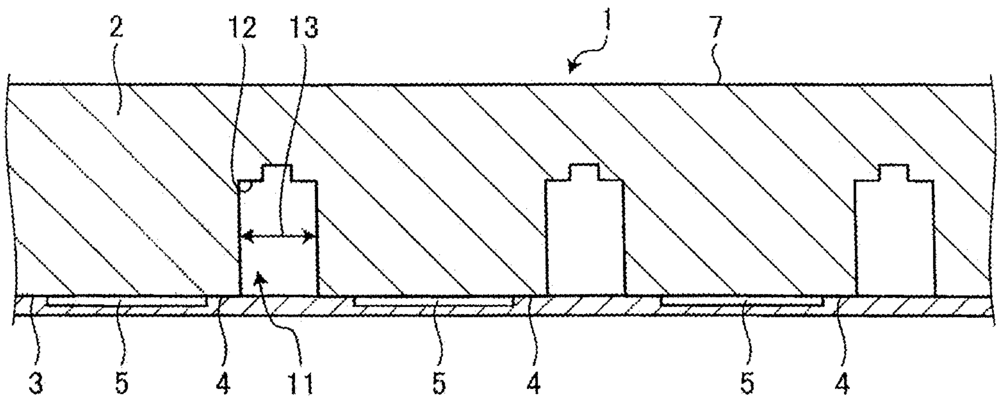
FIG. 19 is a sectional view schematically depicting a major part of the workpiece with a front surface protective member stuck to a front surface thereof in a grinding step of the manufacturing method according to the second embodiment.
Figure 20:
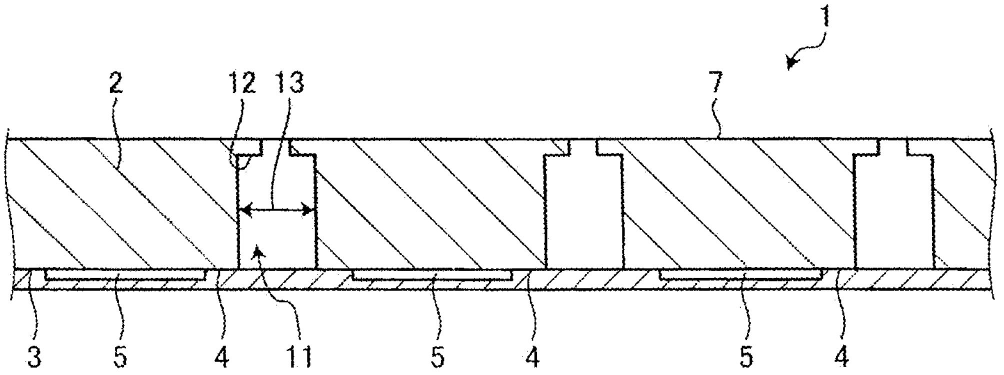
FIG. 20 is a sectional view schematically depicting a major part of the workpiece at an intermediate point of grinding of a back surface in the grinding step of the manufacturing method according to the second embodiment.
Figure 21:
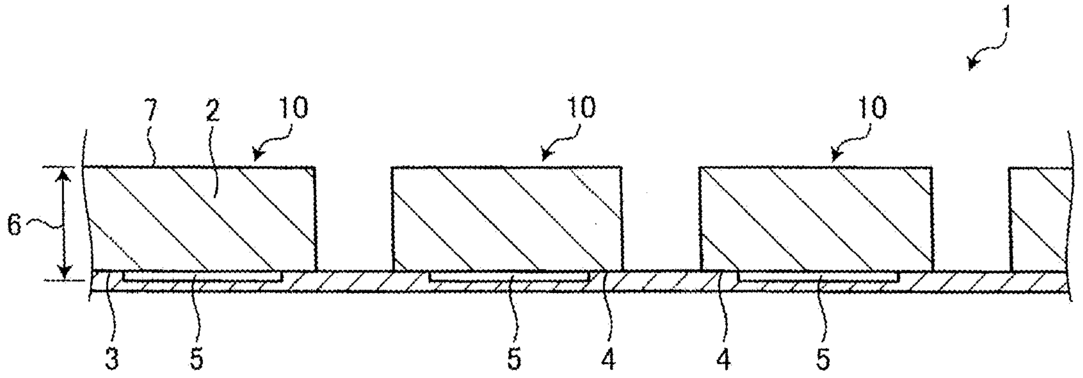
FIG. 21 is a sectional view schematically depicting a major part of the workpiece that has undergone the grinding step of the manufacturing method according to the second embodiment.

A manufacturing method according to a second embodiment of the present invention will be described with reference to the drawings. FIG. 14 is a front view of a cutting unit used in a cutting step of the manufacturing method according to the second embodiment. FIG. 15 is a front view of an edge point of a cutting blade of the cutting unit depicted in FIG. 14. FIG. 16 is a sectional view schematically depicting a major part of a workpiece during a cutting step of the manufacturing method according to the second embodiment. FIG. 17 is a front view of a modification of the cutting unit depicted in FIG. 14. FIG. 18 is a front view of the edge point of the cutting blade of the cutting unit depicted in FIG. 17. FIG. 19 is a sectional view schematically depicting a major part of a workpiece with a front surface protective member stuck to a front surface thereof in a grinding step of the manufacturing method according to the second embodiment. FIG. 20 is a sectional view schematically depicting a major part of a workpiece at an intermediate point of grinding of a back surface thereof in the grinding step of the manufacturing method according to the second embodiment. FIG. 21 is a sectional view schematically depicting a major part of the workpiece that has undergone the grinding step of the manufacturing method according to the second embodiment. In FIGS. 14, 15, 16, 17, 18, 19, 20, and 21, the same parts as those in the first embodiment described above are denoted by the same reference characters, and descriptions of them are omitted.

In the second embodiment, a cutting blade 21-2 used in the cutting step 101 is configured such that a tip surface 274 of the edge point 26 of the cutting edge 25 is formed to be flat along the axis, as depicted in FIGS. 14 and 15. In the cutting step 101 of the second embodiment, the cutting apparatus 20 causes the cutting blade 21-2 to cut into each street 4 of the workpiece 1 a plurality of times with the cutting-in depth varied at least once, to thereby form the cut grooves which are parallel to one another and are continuous with one another. In this way, in the cutting step 101 of the second embodiment, as depicted in FIG. 16, the cutting apparatus 20 causes the cutting blade 21-2 to cut into each street 4 a plurality of times with the cutting-in depth and the cutting-in position varied, to thereby form one cut groove 11 with a step formed at the groove bottom 12 at each street 4.

Note that, in the example depicted in FIG. 16, the cutting blade 21-2 is caused to cut into each street 4 three times at different positions in the width direction, such that the cutting-in depths of the cutting blade 21-2 at both ends in the width direction of the street 4 indicated by a broken line and a long and two short dashes line are the same, whereas the cutting-in depth of the cutting blade 21-2 at the center in the width direction of the street 4 indicated by a solid line is deeper than the cutting-in depths at both ends in the width direction. Note that, in the second embodiment, also, the cutting-in depth of the cutting blade 21-2 is greater than the finish thickness 6.

In this way, in the cutting step 101 of the manufacturing method according to the second embodiment, the depths from the front surface 3 of all the groove bottoms 12 of the cut grooves 11 are formed to be greater than the finish thickness 6 from the front surface 3, and the cut grooves 11 each have a step formed at the groove bottom 12 in the thickness direction of the workpiece 1, such that the position of the groove bottom 12 varies in the width direction of the cut groove 11.

Note that, in the second embodiment of the present invention, a cutting blade 21-3 used in the cutting step 101 may be configured such that a tip surface 275 of the edge point 26 of the cutting edge 25 is arcuate in section, as depicted in FIGS. 17 and 18. Note that, in the second embodiment of the present invention, a mode in which the cut groove 11 is formed by three times of cutting at each street 4 is not limitative, and it is sufficient that the cut groove 11 is formed by a plurality of times of cutting. Further, the form in which the center in the width direction of the cut groove 11 is the deepest is not limitative, and the cut groove 11 may be formed such that the cut groove 11 becomes deeper from one side toward the other side in the width direction of the groove.

In the grinding step 102 of the manufacturing method according to the second embodiment, as in the first embodiment, the front surface protective member 14 is stuck to the front surface 3 of the workpiece 1, as depicted in FIG. 19. In the grinding step 102 of the manufacturing method according to the second embodiment, as in the first embodiment, the back surface 7 of the workpiece 1 is ground, and the workpiece 1 is ground from that tip of the groove bottom 12 of the cut groove 11 which is on the side remote from the front surface 3, as depicted in FIG. 20. In the grinding step 102 of the manufacturing method according to the second embodiment, as in the first embodiment, when the thickness of the workpiece 1 has become the finish thickness 6, the grinding apparatus 30 spaces the grinding wheel 34 away from the back surface 7 of the workpiece 1, to thereby end the grinding step 102, as depicted in FIG. 21. As a result, the cut grooves 11 are exposed on the back surface 7 side of the workpiece 1, and the workpiece 1 is divided into the individual chips 10. In this way, in the grinding step 102 of the first embodiment, the workpiece 1 is ground from the tip of the groove bottom 12 of the cut groove 11.

The manufacturing method according to the second embodiment is configured such that, in the cutting step 101, the cut grooves 11 are formed in such a manner that the depth from the front surface 3 of the groove bottom 12 of the cut groove 11 varies in the width direction, and, in the grinding step 102, the workpiece 1 is gradually ground from that tip of the groove bottom 12 of the cut groove 11 which is on the side remote from the front surface 3; hence, as in the first embodiment, the manufacturing method according to the second embodiment produces an effect that it is possible to restrain the fragments from dropping during grinding.

Next, the inventor of the present invention checked the effect of the manufacturing method according to the first embodiment. In checking, the dropped state of fragments in the grinding step 102 when the cut grooves 11 were formed by cutting blades 21 having different angles θ and other relevant matters were checked. The results are set forth in Table 1 below.

Note that, in Comparative Example 1, the cut grooves 11 were formed by cutting each street 4 only once by the cutting blade 21-2 having an angle θ of 180 degrees, that is, the cutting blade 21-2 depicted in FIG. 15. In Comparative Example 2, the cut grooves 11 were formed by cutting each street 4 only once by a cutting blade 21 having an angle θ of 170 degrees. In Comparative Example 3, the cut grooves 11 were formed by cutting each street 4 only once by a cutting blade 21 having an angle θ of 110 degrees.

TABLE 1

| | θ | Dropped states of fragments |
|---|---|---|
| Comparative Example 1 | 180° (flat) | Some |
| Comparative Example 2 | 170° | Some |
| First inventive item | 160° | None |
| Second inventive item | 150° | None |
| Third inventive item | 140° | None |
| Fourth inventive item | 130° | None |
| Fifth inventive item | 120° | None |
| Comparative Example 3 | 110° | — |

In the First Inventive Item, the cut grooves 11 were formed by cutting each street 4 only once by a cutting blade 21 having an angle θ of 160 degrees. In the Second Invention Item, the cut grooves 11 were formed by cutting each street 4 only once by a cutting blade 21 having an angle θ of 150 degrees. In the Third Inventive Item, the cut grooves 11 were formed by cutting each street 4 only once by a cutting blade 21 having an angle θ of 140 degrees. In the Fourth Inventive Item, the cut grooves 11 were formed by cutting each street 4 only once by a cutting blade 21 having an angle θ of 130 degrees. In the Fifth Inventive Item, the cut grooves 11 were formed by cutting each street 4 only once by a cutting blade 21 having an angle θ of 120 degrees.

According to Table 1, in Comparative Examples 1 and 2, dropping of fragments occurred during the grinding step 102. In Comparative Example 3, dropping of fragments did not occur, but, due to an increase in the cutting-in amount of the cutting blade 21, the processing time for forming the cut grooves 11 was prolonged unfavorably.

In contrast to these Comparative Examples 1, 2, and 3, the First to Fifth Inventive Items were free of the problem of fragments dropping during the grinding step 102, and were free of the problem of prolongation of the processing time for forming the cut grooves 11.

According to Table 1, it has been made clear that, when the cut grooves 11 are formed by a cutting blade 21 having an angle θ of not less than 120 degrees but not more than 160 degrees, preferably an angle θ of not less than 120 degrees but not more than 130 degrees, there arises no problem of dropping of fragments during the grinding step 102 and also no problem of prolongation of the processing time for forming the cut grooves 11.

Note that the present invention is not to be limited to the above-described embodiments. In other words, various modifications can be made in carrying out the present invention in such ranges as not to depart from the gist of the invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A manufacturing method for manufacturing a plurality of chips by dividing a workpiece with a plurality of intersecting streets set thereon, the manufacturing method comprising:

a cutting step of cutting one surface of the workpiece by a cutting blade to thereby form cut grooves along the streets, the cut grooves having peripheral surfaces between each of the plurality of chips and a groove bottom having a tip; and a grinding step of grinding another surface on a side opposite to the one surface of the workpiece to thereby thin the workpiece to a finish thickness of reaching the cut grooves and to divide the workpiece into the plurality of chips, after the cutting step is carried out, wherein the cut grooves are formed such that the groove bottom has flat surfaces inclined relative to the peripheral surfaces, the flat surfaces connecting the respective peripheral surfaces and the tip of the groove bottom, and, in the grinding step, a tip of the groove bottom is ground before any other portion of the cut groove.

2. The manufacturing method according to claim 1, wherein, in the cutting step, depths of all the groove bottoms of the cut grooves from the one surface are greater than the finish thickness from the one surface and the flat surfaces of the groove bottom are completely removed during the grinding step such that only the peripheral surfaces of the groove remain after the grinding step.

3. The manufacturing method according to claim 1, wherein, in the cutting step, the cut grooves are formed by a cutting blade of which a blade thickness is gradually reduced toward a tip.

4. The manufacturing method according to claim 1, wherein the flat inclined surfaces of the groove bottom are formed to an angle from the peripheral surfaces to the tip of the groove bottom is between and including 120° and 160°.

5. The manufacturing method according to claim 4, wherein the cutting blade is formed in a V-shape, each respective side of the V-shape equal to the angle to form the cut grooves at the angle of the groove bottom.

6. The manufacturing method according to claim 4, wherein the cutting blade is tapered equal to the angle such that the cutting step is performed twice to form the cut grooves at the angle of the groove bottom.

7. A manufacturing method for manufacturing a plurality of chips by dividing a workpiece with a plurality of intersecting streets set thereon, the manufacturing method comprising:

a cutting step of cutting one surface of the workpiece by a cutting blade to thereby form cut grooves along the streets, the cut grooves having peripheral surfaces between each of the plurality of chips and a groove bottom having a tip; and a grinding step of grinding another surface on a side opposite to the one surface of the workpiece to thereby thin the workpiece to a finish thickness of reaching the cut grooves and to divide the workpiece into the plurality of chips, after the cutting step is carried out, wherein the cutting blade is configured and arranged such that a tip surface of an edge point of a cutting edge of the cutting blade is formed to be flat along an axis of the cutting blade, wherein, in the cutting step, the cutting blade is caused to cut into each street a plurality of times with a cutting-in depth and a cutting-in position varied to thereby form one cut groove with a step formed at the groove bottom at each street, and wherein, in the grinding step, a tip of the groove bottom is ground before any other portion of the cut groove.

8. The manufacturing method according to claim 7, wherein, in the cutting step, depths of all the groove bottoms of the cut grooves from the one surface are greater than the finish thickness from the one surface and the flat surfaces of the groove bottom are completely removed during the grinding step such that only the peripheral surfaces of the groove remain after the grinding step.

9. A manufacturing method for manufacturing a plurality of chips by dividing a workpiece with a plurality of intersecting streets set thereon, the manufacturing method comprising:

a cutting step of cutting one surface of the workpiece by a cutting blade to thereby form cut grooves along the streets, the cut grooves having peripheral surfaces between each of the plurality of chips and a groove bottom having a tip; and a grinding step of grinding another surface on a side opposite to the one surface of the workpiece to thereby thin the workpiece to a finish thickness of reaching the cut grooves and to divide the workpiece into the plurality of chips, after the cutting step is carried out, wherein the cut grooves are formed such that the groove bottom has a flat surface inclined relative to the peripheral surfaces, the flat surface connecting one of the peripheral surfaces and the tip of the groove bottom, the tip of the groove bottom being formed at an intersection of the other of the peripheral surface and the flat surface, and, in the grinding step, a tip of the groove bottom is ground before any other portion of the cut groove.

10. The manufacturing method according to claim 9, wherein, in the cutting step, depths of all the groove bottoms of the cut grooves from the one surface are greater than the finish thickness from the one surface and the flat surface of the groove bottom is completely removed during the grinding step such that only the peripheral surfaces of the groove remain after the grinding step.

* * * * *